(12) United States Patent
Johansson

(10) Patent No.: US 10,715,378 B2
(45) Date of Patent: Jul. 14, 2020

(54) HASH-BASED SELECTION OF NETWORK PACKETS FOR PACKET FLOW SAMPLING IN NETWORK COMMUNICATION SYSTEMS

(71) Applicant: Keysight Technologies Singapore (sales) Pte. Ltd., Singapore (SG)

(72) Inventor: Stefan Johansson, Round Rock, TX (US)

(73) Assignee: Keysight Technologies Singapore (Sales) Pte. Ltd., Singapore (SG)

( * ) Notice: Subject to any disclaimer, the term of this patent is extended or adjusted under 35 U.S.C. 154(b) by 189 days.

(21) Appl. No.: 15/692,152

(22) Filed: Aug. 31, 2017

(65) Prior Publication Data

US 2018/0367364 A1 Dec. 20, 2018

Related U.S. Application Data

(60) Provisional application No. 62/521,748, filed on Jun. 19, 2017.

(51) Int. Cl.
*H04L 12/26* (2006.01)
*G06F 11/34* (2006.01)
(Continued)

(52) U.S. Cl.
CPC ...... *H04L 41/0213* (2013.01); *G06F 11/3495* (2013.01); *H04L 41/0896* (2013.01);
(Continued)

(58) Field of Classification Search
CPC ..... H04L 43/106; H04L 43/026; H04L 43/08; H04L 43/028; H04L 43/06; H04L 43/062;
(Continued)

(56) References Cited

U.S. PATENT DOCUMENTS 6,738,355 B1 * 5/2004 Love ...................... H04L 43/12
370/244
6,778,495 B1 8/2004 Blair
(Continued)

FOREIGN PATENT DOCUMENTS

EP 1195954 A2 4/2002

OTHER PUBLICATIONS

Trammell et al., "Applying IPFIX to Network Measurement and Management", IETF, 77 pgs. (Jul. 2013).
(Continued)

*Primary Examiner* — Hoang-Chuong Q Vu

(57) ABSTRACT

Systems and methods are disclosed for hash-based selection of network packets for packet flow sampling in network communication systems. Input packets associated with packet flows within a network communication system are received by a hash-based sampler. The hash-based sampler then generates hash values for the input packets based upon fields within the input packets. These fields are selected to identify packet flows for the input packets. The hash values for the input packets are then compared to a mask. The mask is configured to determine a subset of packet flows for which to forward packets. Based upon this comparison, certain input packets are selected to be forwarded for further processing, and non-selected packets are discarded. The further processing can include processing the selected input packets to generate flow statistics data (e.g., IPFIX) for the selected input packets.

34 Claims, 8 Drawing Sheets

(51) Int. Cl.
*H04L 12/24* (2006.01)
*H04L 12/701* (2013.01)

(52) U.S. Cl.
CPC ............ *H04L 43/106* (2013.01); *H04L 45/00* (2013.01); *G06F 2201/80* (2013.01); *G06F 2201/815* (2013.01); *H04L 41/0226* (2013.01); *H04L 43/026* (2013.01); *H04L 43/08* (2013.01)

(58) Field of Classification Search
CPC ............ H04L 41/0213; H04L 41/0896; H04L 41/0226; G06F 2201/80; G06F 2201/815; G06F 11/3495
See application file for complete search history.

(56) References Cited

U.S. PATENT DOCUMENTS

| | | | |
|---|---|---|---|
| 6,871,265 B1 | 3/2005 | Oren et al. | |
| 7,385,924 B1 | 6/2008 | Riddle | |
| 7,911,975 B2 | 3/2011 | Droz et al. | |
| 7,941,606 B1* | 5/2011 | Pullela | H04L 69/22 711/128 |
| 7,957,396 B1* | 6/2011 | Kohn | H04L 47/2441 370/395.32 |
| 9,674,087 B2* | 6/2017 | Jackson | H04L 45/7453 |
| 9,686,185 B2* | 6/2017 | Shelly | H04L 45/38 |
| 10,355,994 B1* | 7/2019 | Matthews | H04L 45/7453 |
| 10,511,531 B1* | 12/2019 | Matthews | G06F 16/2255 |
| 2005/0149721 A1* | 7/2005 | Lu | H04L 63/0227 713/154 |
| 2007/0217425 A1 | 9/2007 | Claise et al. | |
| 2009/0307175 A1* | 12/2009 | Francesco | G06F 9/4498 706/48 |
| 2010/0226282 A1 | 9/2010 | Aitken et al. | |
| 2012/0078832 A1* | 3/2012 | Lunteren | G06N 5/02 706/47 |
| 2012/0243544 A1* | 9/2012 | Keesara | H04L 12/4633 370/395.53 |
| 2014/0241362 A1* | 8/2014 | Bosshart | H04L 69/22 370/392 |
| 2014/0304393 A1 | 10/2014 | Annamalaisami et al. | |
| 2015/0131666 A1* | 5/2015 | Kang | H04L 45/745 370/392 |
| 2016/0094460 A1* | 3/2016 | Shelar | H04L 45/56 370/392 |
| 2016/0315880 A1* | 10/2016 | Guo | H04L 43/04 |
| 2017/0126567 A1* | 5/2017 | Wang | H04L 45/7453 |
| 2018/0054475 A1* | 2/2018 | Agarwal | H04L 12/4641 |
| 2018/0074861 A1* | 3/2018 | Chowdhuri | G06F 7/58 |

OTHER PUBLICATIONS

Hofstede et al., "Flow Monitoring Explained: From Packet Capture to Data Analysis With NetFlow and IPFIX", IEEE, 31 pgs. (May 2014).

Extended European Search Report, Application No. 18166321.2, dated Oct. 9, 2018, 7 pgs.

* cited by examiner

HASH-BASED SELECTION OF NETWORK PACKETS FOR PACKET FLOW SAMPLING IN NETWORK COMMUNICATION SYSTEMS

RELATED APPLICATIONS

This application claim priority to U.S. Provisional Patent Application Ser. No. 62/521,748, which was filed Jun. 19, 2017, and is entitled "HASH-BASED SELECTION OF NETWORK PACKETS FOR PACKET FLOW SAMPLING IN NETWORK COMMUNICATION SYSTEMS," which is hereby incorporated by reference in its entirety.

TECHNICAL FIELD

This invention relates to monitoring packet flows within network packet communication systems and, more particularly, to processing of packet flows for flow statistics reporting in network packet communication systems.

BACKGROUND

Packet-based data networks continue to grow in importance, and it is often desirable to monitor network traffic associated with these packet-based networks. For certain network packet communication systems, packet flow statistics are collected and reported for network packet flows. IPFIX (IP Flow Information eXport) is a protocol standard associated with such collection and reporting of statistics for network packet flows. IPFIX is based upon a prior protocol called NetFlow that was developed by Cisco Systems.

FIG. 1A (Prior Art) is a block diagram of an example embodiment 100 for a network communication system where packet flow statistics are collected and reported using the IPFIX protocol standard. A network 102 includes a number of different network connected devices that are communicating with each other using a number of different packet flows. At least a portion of these packet flows are routed by the network router 110, which can include a number of different input/output (I/O) ports that are used to receive and send packets. For the embodiment 100, packets received by the network router 110 are represented by input packets 104, and packets sent by the network router 110 are represented by output packets 106. A switch 112 within the network router 110 receives the input packets 104 from network sources and routes them to the appropriate network destinations through output packets 106. These input and output packets 104/106 are assumed to include packets within a number of different packet flows for the network 102.

The IPFIX engine 120 also receives the input packets 104 and processes the packets to collect flow statistics associated with packet flows represented within the input packets 104. These packet flow statistics are stored in a flow table 122. When the termination of a particular packet flow is detected by the IPFIX engine 120, the IPFIX engine 120 sends a packet reporting the data record for the packet flow that was stored in the flow table 122. These IPFIX report packets 108 are sent to an IPFIX collection server 130 where the flow data statistics provided by the IPFIX report packets 108 are aggregated and stored in a flow statistics database 132. The IPFIX collection server 130 can also include an IPFIX controller that controls operation of the IPFIX collection server 130. A user interface 134 can also be included within the collection server 130 and allows external uses, such as network managers, to access, view and analyze the data within the flow statistics database 132.

FIG. 1B (Prior Art) is a diagram of an example embodiment for the flow table 122 that is used by the IPFIX engine 120 to collect and store flow data associated with the packet flows 128 within the input packets 104 as represented by FLOW1, FLOW2, ..., FLOW(N). For each of the packet flows 128, a five-tuple flow identifier 124 is stored that includes a source address (SIP), a destination address (DIP), a protocol type (TYPE), a source port (S-PORT), and a destination port (D-PORT). For each of the packet flows 128, flow data is also collected and stored. This collected data 126 includes a start time (START), an end time (END), number of bytes (# BYTES), and a number of packets (# PACKETS). It is noted that the source and destination addresses (SIP/DIP) can be, for example, source and destination IP (Internet Protocol) addresses. The protocol type represents the communication protocol used for the packet flow such as TCP (Transmission Control Protocol), UDP (User Datagram Protocol), SCTP (Stream Control Transmission Protocol), and/or other communication protocols. The source and destination ports (S-PORT/D-PORT) can be, for example, communication ports used at the packet source and destination for the packet flow. When the IPFIX engine 120 determines that a packet flow has ended, the flow record for that packet flow is sent in a report packet to the collection server as indicated by arrow 125.

Disadvantages to implementing IPFIX processing within the network router 110, however, include the memory space required for the flow table 122 and the additional processing resources required for the IPFIX engine 120. The main performance bottleneck is the memory bandwidth and size required for the flow table 122.

SUMMARY

Systems and methods are disclosed for hash-based selection of network packets for packet flow sampling in network communication systems. For the disclosed embodiments, input packets associated with packet flows within a network communication system are received by a hash-based sampler. The hash-based sampler then generates hash values for the input packets based upon fields within the input packets. These fields are selected to identify packet flows for the input packets. The hash values for the input packets are then compared to a mask. The mask is configured to determine a subset of packet flows for which to forward packets. Based upon this comparison, certain input packets are selected to be forwarded for further processing, and non-selected packets are discarded. For certain embodiments, the further processing includes processing the selected input packets from the subset of packet flows to generate flow statistics data for the selected input packets. The flow statistics data can include data collected according to the IPFIX (IP Flow Information eXport) protocol. Other features and variations can be implemented, if desired, and related systems and methods can be utilized, as well.

For one embodiment, a method to forward selected packets based upon packet flows within a network communication system is disclosed including receiving input packets associated with packet flows within a network communication system, generating hash values for the input packets based upon fields within the input packets, the fields identifying packet flows for the input packets, selecting packets from the input packets based upon a comparison of the hash values to a mask, the mask determining a subset of the packet flows, forwarding selected packets for further processing, and discarding non-selected packets.

In additional embodiments, the input packets are selected for forwarding based upon at least one of the hash values matching the mask or the hash values not matching the mask. In further embodiments, the receiving, generating, selecting, forwarding, and discarding are performed within at least one of a tap device, a network router, or a network packet broker. In still further embodiments, the method also includes forwarding the discarded non-selected packets to a network tool for further processing.

In additional embodiments the mask is programmable to select a portion of packet flows to include within the subset of flow packets. In further embodiments, the mask includes multiple bits where each of the multiple bits is set to a logic "1" or a logic "0" or a "don't care" value. In still further embodiments, the mask includes a Boolean combination of a plurality of sets of multiple bits. In another further embodiment, the method also includes receiving a control signal to determine the mask. In a further embodiment, the receiving, generating, selecting, forwarding, and discarding are performed in a tap device, and the control signals are received from a network packet broker.

In additional embodiments, the fields for generation of the hash values include a source address (SIP), a destination address (DIP), a protocol type (TYPE), a source port (S-PORT), and a destination port (D-PORT). In further embodiments, the method also includes, before generating each hash value, performing an XOR operation on the source address (SIP) and the destination address (DIP) and performing an XOR operation on the source port (S-PORT) and the destination port (D-PORT). In still further embodiments, the method also includes, before generating each hash value, sorting the source address (SIP), the destination address (DIP), the protocol type (TYPE), the source port (S-PORT), and the destination port (D-PORT).

In additional embodiments, the method also includes processing the selected input packets forwarded from the subset of packet flows to generate flow statistics data for the selected input packets. In further embodiments, the method also includes storing the flow statistics data within a flow table where each record within the flow table is used to store flow statistics data for a particular packet flow. In still further embodiments, the flow statistics data includes data collected according to the IPFIX (IP Flow Information eXport) protocol. In another further embodiment, the method also includes forwarding report packets to a collection server when packet flows end where each report packet includes one or more records from the flow table including packet flow statistics data. In further embodiments, the receiving, generating, forwarding, discarding, and processing are performed within a tap device.

For one embodiment, a system to forward selected packets based upon packet flows within a network communication system is disclosure that includes an input buffer configured to receive input packets associated with packet flows within a network communication system, a hash generator coupled to receive the input packets from the input buffer and configured to generate hash values for the input packets based upon fields within the input packets where the fields are selected to identify packet flows for the input packets, and a packet processor coupled to receive the input packets from the input buffer and to receive the hash values from the hash generator. Further, the packet processor is programmed to select packets from the input packets based upon a comparison of the hash values to a mask, the mask determining a subset of the packet flows, forward selected packets for further processing, and discard non-selected packets.

In additional embodiments, the packet processor is configured to select input packets for forwarding based upon at least one of the hash values matching the mask or the hash values not matching the mask. In further embodiments, the input buffer, the hash generator, and the packet processor are located within at least one of a tap device, a network router, or a network packet broker. In still further embodiments, the packet process is also configured to forward the discarded non-selected packets to a network tool for further processing.

In additional embodiments, the mask is programmable to select a portion of packet flows to include within the subset of flow packets. In further embodiments, the mask includes multiple bits, each of the multiple bits being set to a logic "1" or a logic "0" or a "don't care" value. In still further embodiments, the mask includes a Boolean combination of a plurality of sets of multiple bits. In another further embodiment, the packet processor is further configured to receive a control signal to determine the mask. In further embodiments, the input buffer, the hash generator, and the packet processor are located within a tap device, and the tap device is configured to receive the control signals from a network packet broker.

In additional embodiments, the fields for generation of the hash values include a source address (SIP), a destination address (DIP), a protocol type (TYPE), a source port (S-PORT), and a destination port (D-PORT). In further embodiments, the hash generator is further configured, before generating each hash value, to perform an XOR operation on the source address (SIP) and the destination address (DIP) and to perform an XOR operation on the source port (S-PORT) and the destination port (D-PORT). In still further embodiments, the hash generator is further configured, before generating each hash value, to sort the source address (SIP), the destination address (DIP), the protocol type (TYPE), the source port (S-PORT), and the destination port (D-PORT).

In additional embodiments, the system also includes a flow statistics engine coupled to receive the selected packets forwarded by the packet processor and configured to process the selected packets to generate flow statistics data for the selected input packets. In further embodiments, the flow statistics engine is further configured to store the flow statistics data within a flow table where each record within the flow table is used to store flow statistics data for a particular packet flow. In still further embodiments, the flow statistics data includes data collected according to the IPFIX (IP Flow Information eXport) protocol. In another further embodiment, the flow statistics engine is further configured to forward report packets to a collection server when packet flows end where each report packet includes one or more records from the flow table including packet flow statistics data. In further embodiments, the input buffer, the hash generator, the packet processor, and the flow statistics engine are located within a tap device.

Different or additional features, variations, and embodiments can be implemented, if desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION

Figure 1A:
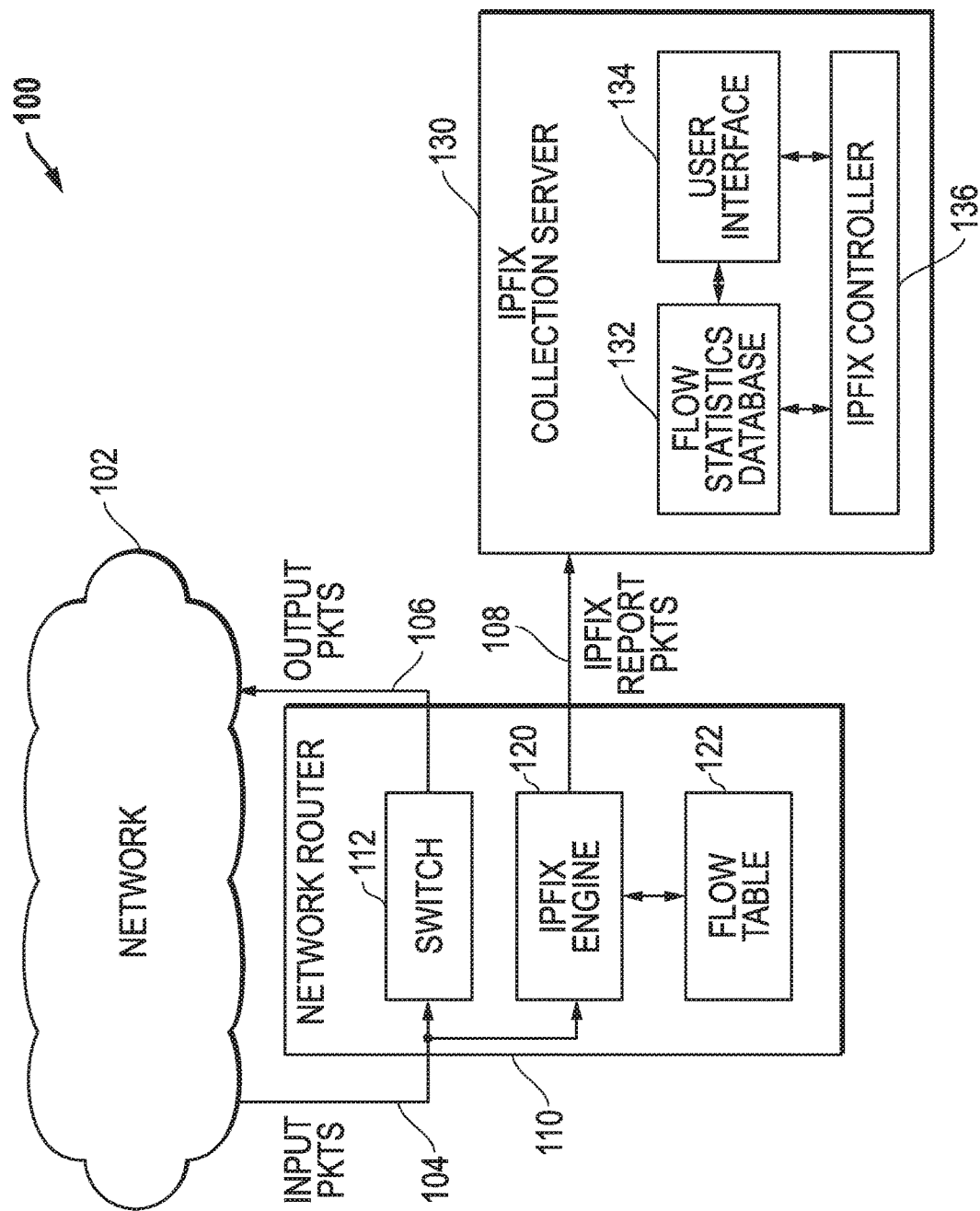
FIG. 1A (Prior Art) is a block diagram of an example embodiment for a network communication system where packet flow statistics are collected and reported using the IPFIX (IP Flow Information eXport) protocol standard.

Network packet forwarding systems and methods are disclosed for hash-based selection of network packets for packet flow sampling in network communication systems. Systems and methods are disclosed for hash-based selection of network packets for packet flow sampling in network communication systems. For the disclosed embodiments, input packets associated with packet flows within a network communication system are received by a hash-based sampler. The hash-based sampler then generates hash values for the input packets based upon fields within the input packets. These fields are selected to identify packet flows for the input packets. The hash values for the input packets are then compared to a mask. The mask is configured to determine a subset of packet flows for which to forward packets. Based upon this comparison, certain input packets are selected to be forwarded for further processing, and non-selected packets are discarded. For certain embodiments, the further processing includes processing the selected input packets from the subset of packet flows to generate flow statistics data for the selected input packets. The flow statistics data can include data collected according to the IPFIX (IP Flow Information eXport) protocol. As indicated above, IPFIX is based upon a prior protocol called NetFlow that was developed by Cisco Systems. While the discussions herein refer primarily to the IPFIX protocol, it is understood that the disclosed embodiments are also useful for other protocols for the collection of packet flow statistics data including, but not limited to, NetFlow Version 9, other NetFlow versions, and/or other protocols. Different features and variations can be implemented, as desired, and related systems and methods can be utilized, as well.

As described herein, processing and memory resources become strained when network connected devices process network packets within packet flows, for example, when processing network packets to collect packet flow statistics. One way to reduce processing in generating packet flow statistics, for example using the IPFIX (IP Flow Information eXport) protocol standard, is to use packet sampling. Instead of processing every packet, only one out of every "N" number of packets is randomly selected to be processed for packet flow statistics. If pure random sampling were used, however, the random sampling would be expected to affect all packet flows equally, and in most cases the number of packet flows detected and tracked in a flow table would still be the same. Further, if an attempt is made to ignore all packets within selected flows to reduce the number of flows to be tracked, details for these selected flows must still be stored in a flow table or a separate state table so that future packets can be matched to these selected flows and then subsequently ignored if matches are found. Thus, memory resources are still required to keep track of the details for these selected flows for which later packets will be ignored.

For the embodiments described herein, hash-based packet flow sampling is implemented to provide a stateless technique for ignoring packets within a subset of packet flows without requiring the maintenance of flow information for ignored flows in a flow table or a separate state table. Further, the percentage of flows ignored can be adjusted by using a mask to select which packet flows are ignored and which packet flows are processed for packet flow statistics. In particular, the ratio of the number of bits required in this mask to the number of bits set as "don't care" bits is used to determine the percentage of ignored packets flows within the network traffic being monitored. The bit length of the generated hash values and mask can also be used to adjust the available granularity of this packet flow selection. Other variations can also be implemented while still taking advantage of the hash-based selection of network packets for packet flow sampling in network communication systems.

Figure 2A:
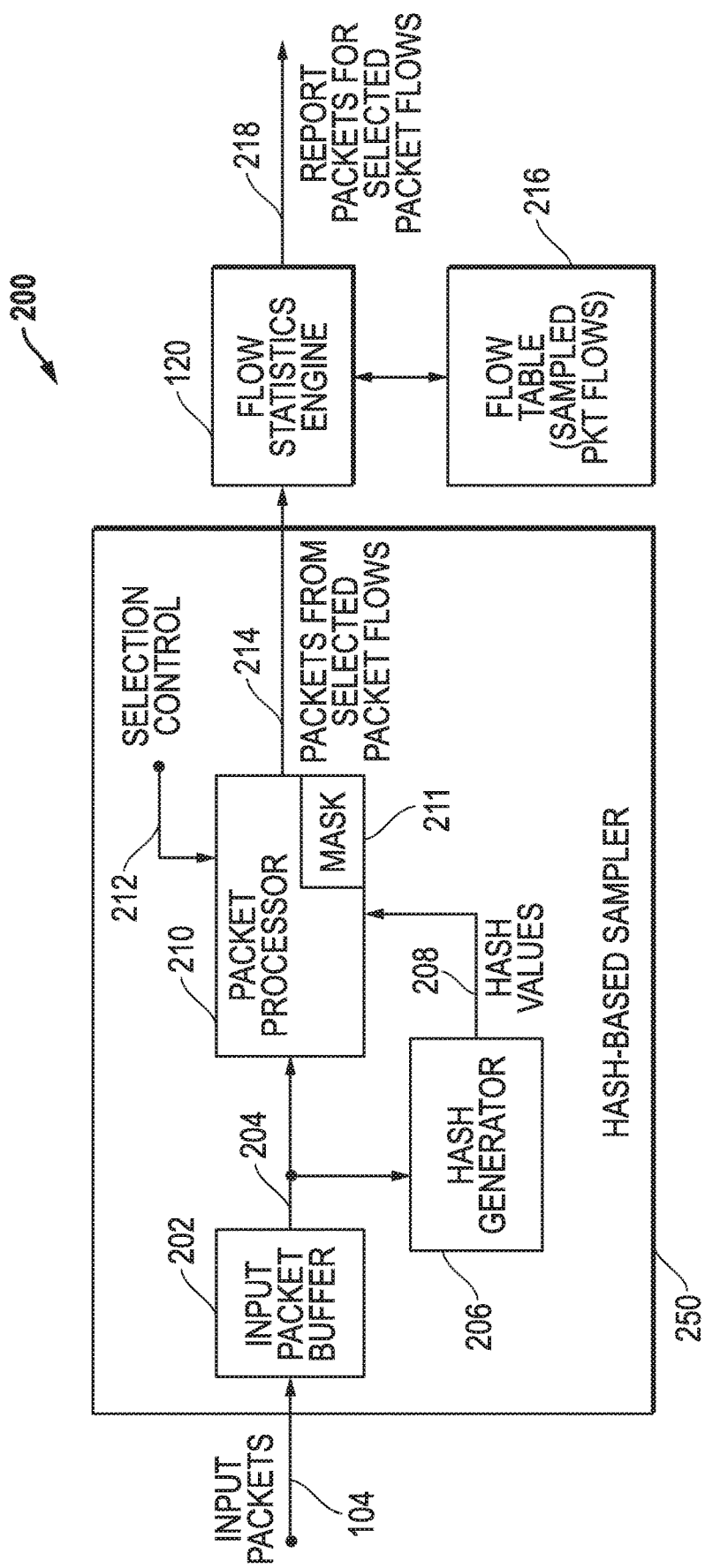
FIG. 2A is a block diagram of an example embodiment for a hash-based sampler that selects network packets from a subset of packet flows to be forwarded for further processing within a network communication system.

FIG. 2A is a block diagram of an example embodiment 200 for a hash-based sampler 250 that selects network packets from a subset of packet flows to be forwarded for further processing within a network communication system. As described herein, the hash-based sampler 250 operates to forward packets for further processing only if they fall within a subset of packet flows within the input packets 104 being collected and monitored for flow statistics. For example embodiment 200, input packets 104 are received by an input packet buffer 202 and then forwarded as packets 204 to the hash generator 206 and to the packet processor 210. The hash generator 206 performs one or more hash functions on a plurality of fields within each of the input packets 104. The plurality of fields is selected to provide a unique flow identifier. For example, the selected fields within the input packets 104 that are used by the hash generator 206 to generate hash values 208 can be the five-tuple described above that includes the source address (SIP), the destination address (DIP), the protocol type (TYPE), the source port (S-PORT), and the destination port (D-PORT). Although this five-tuple is commonly used to identify the packet flow for a received packet, other selected fields (e.g., tuples) could be used to identify packet flows for the input packets 104 if desired.

It is also noted that packet flows typically identify a packet stream in one direction. However, many communication events and data transfers are bi-directional including one upstream flow and one downstream flow. These related upstream/downstream flows will typically use the same IP addresses and port numbers, except in the reverse order. Considering the 5-tuple above, the two upstream/downstream packet flows would be: {ip1, ip2, type, port1, port2} and {ip2, ip1, type, port2, port1}, respectively. Without modification to these 5-tuples, the hash algorithm would generate different hash values for each of these two related packet flows. However, it can be desirable to monitor these related packet flows in pairs. As such, for circumstances where pair-wise processing of upstream/downstream packet flows is desired, the hash-based sampling described herein can be modified to generate the same hash for each of the flows in a related upstream/downstream pair. One technique that can be used for this pair-wise processing is to perform an XOR (exclusive OR) operation on the SIP and DIP addresses and perform an XOR operation on the S-PORT and D-PORT numbers before generating the hash values. Further to the example above, "ip1" XOR "ip2" will yield the same value as "ip2" XOR "ip1," and "port 1" XOR "port2" will yield the same value as "port2" XOR "port1." When the hash algorithm is them applied using the resulting XOR'ed values, the same hash value will be generated for both flows. Another technique that can be used to achieve this result is to sort the fields for the 5-tuple (e.g., SIP/DIP addresses, protocol type, S-PORT/D-PORT port numbers) in some numerical order before applying the hash (e.g., increasing value, decreasing value, etc.). This numerical sorting prior to applying the hash algorithm will also result in the same hash value for both flows. Other variations can also be implemented while still taking advantage of the hash-based selection of network packets for packet flow sampling in network communication systems.

The packet processor 210 receives the hash values 208 from the hash generator 206 and uses these hash values 208 in combination with mask 211 to select which packets are output for further processing, such as to the flow statistics engine 120. For one example embodiment, the hash values 208 are compared to the mask 211, and packets matching the mask 211 are selected to be forwarded to the flow statistics engine 120. For another example embodiment, the hash values 208 are compared to the mask 211, and packets not matching the mask 211 are selected to be forwarded to the flow statistics engine 120. Non-selected packets are discarded. As such, the mask 211 selects packets 214 from a subset of packet flows for further processing, such as by the statistics engine 120. The mask 211 can be programmable and can be determined by one or more selection control signals 212. As described further below, the mask 211 can also be adjusted overtime to change the relative percentage of packet flows that are selected for processing by the statistics engine 120.

For the example embodiment 200, the statistics engine 120 processes the output packets 214 and collects flow statistics that are stored in the flow table 216 for the selected packet flows. Once the flow statistics engine 120 detects that a packet flow has ended, a report packet is sent as one of the report packets 218, and these report packets 218 include information only for the selected packet flows. As described above, a collection server can receive these report packets 218 and aggregate the packet flow statistics for further processing and/or access and review by network managers. It is also noted that the packet flow statistics processing and collection can be implemented according to the IPFIX protocol standard and/or other desired packet flow statistics protocols. Although further processing of the selected packets 214 is shown to be performed by the flow statistics engine 120, the selected packets 214 can be forwarded to one or more different network components for further processing, such as for example, a network packet broker and/or other desired network component. Other variations can also be implemented while still taking advantage of the hash-based selection of network packets for packet flow sampling in network communication systems.

Figure 1B:
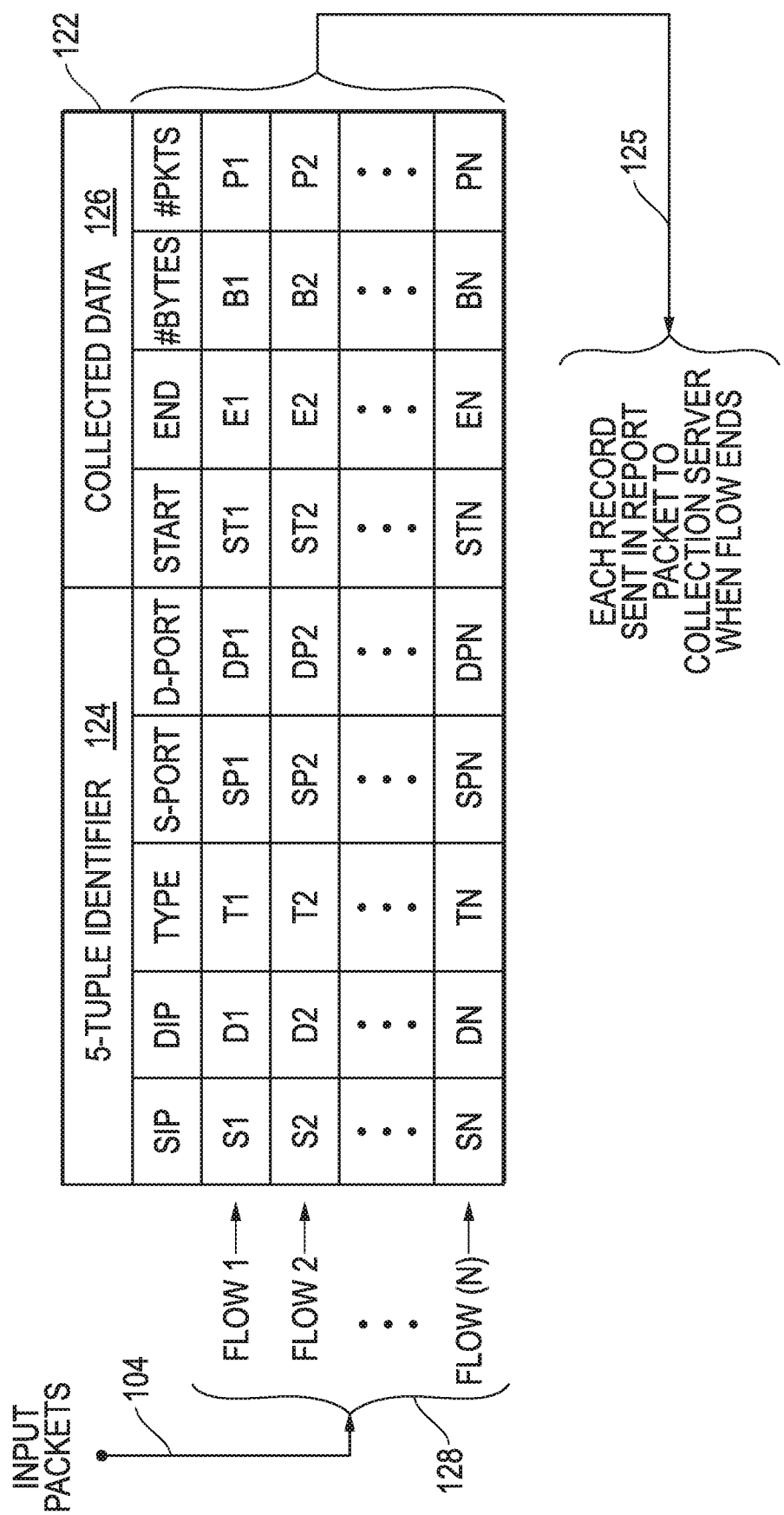
FIG. 1B (Prior Art) is a diagram of an example embodiment for the flow table that is used by the IPFIX engine to collect and store flow data associated with the packet flows within the input packets.
Figure 2B:
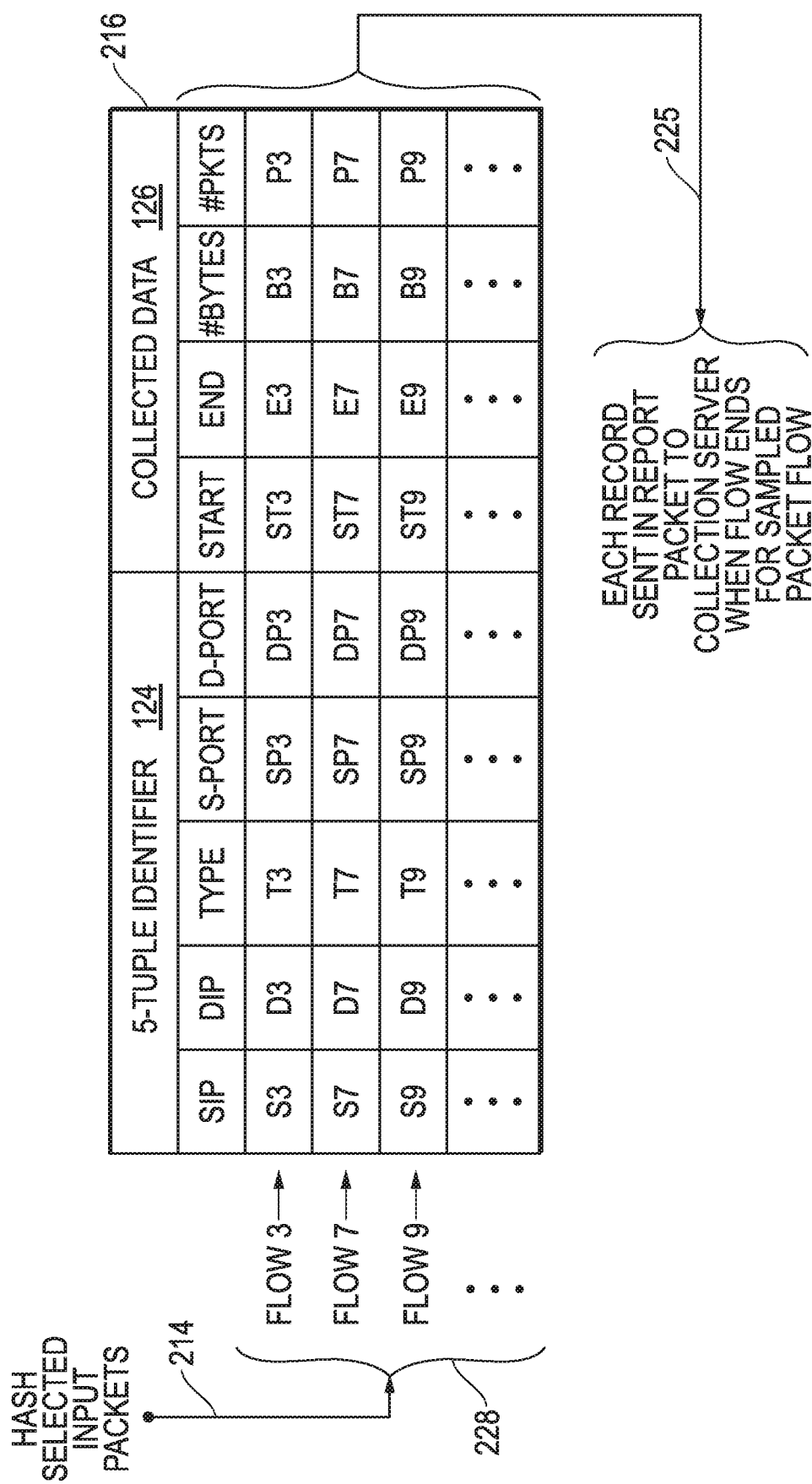
FIG. 2B is a diagram of an example embodiment for the flow table that is used by a flow statistics engine, such as an IPFIX flow statistics engine, to collect and store flow data associated with the selected input packets from the subset of packet flows.

FIG. 2B is a diagram of an example embodiment for the flow table 216 that is used by the flow statistics engine 120, such as an IPFIX flow statistics engine, to collect and store flow data associated with packets 204 from the subset of selected packet flows 228 as represented by FLOW3, FLOW7, FLOW8, and so on. For each of the selected packet flows 228, a five-tuple flow identifier 124 is stored that includes a source address (SIP), a destination address (DIP), a protocol type (TYPE), a source port (S-PORT), and a destination port (D-PORT). For each of the packet flows 228, flow data is also collected and stored. This collected data 126 includes a start time (START), an end time (END), number of bytes (# BYTES), and a number of packets (# PACKETS). It is noted that the source and destination addresses (SIP/DIP) can be, for example, source and destination IP (Internet Protocol) addresses. The protocol type represents the communication protocol used for the packet flow such as TCP (Transmission Control Protocol), UDP (User Datagram Protocol), SCTP (Stream Control Transmission Protocol), and/or other communication protocols. The source and destination ports (S-PORT/D-PORT) can be, for example, communication ports used by the source and destination for the packet flow. When the flow statistics engine 120 determines that a packet flow has ended for selected packet flow, the flow record is sent in a report packet to the collection server as represented by arrow 225. In comparison to FIG. 1B (Prior Art) it is seen that fewer flow records are stored within the flow table 216 as compared to the flow table 122 thereby reducing processing and memory resource requirements.

For the hash-based sampling of packet flows, it is assumed that packets within each packet flow can be uniquely identified using a selected number (N) of keys extracted from fields within every packet to form an N-tuple value. For one example as described above, the keys can be data extracted from the following fields in every packet: source IP address (SIP), the destination address (DIP), the protocol type (TYPE), the source port (S-PORT), and the destination port (D-PORT). These fields are used to form a five-tuple value that uniquely identifies the packet flow for a given packet. The hash generator 206 then applies one or more hash algorithms to the selected keys to hash the N-tuple value generated from these selected keys into a smaller hash value. Each packet flow will have a different resulting hash value since the N-tuple is designed to uniquely identify the packet flow. For example, for the five-tuple described above, the source/destination IP (Internet Protocol) addresses and the source/destination port numbers are expected to be different for each packet flow. Further, all packets in a given packet flow are expected to have the same hash value because they will have the same N-tuple value that is being hashed. Sampling to select packet flows to further process can then be done by selecting only packets having hash values that match (or do not match) certain hash values determined by the mask 211.

For example, consider for one embodiment selecting only packets with a hash value where the three least significant bits are "011." Such a mask and packet selection allows only packets within one out of every eight packet flows to be output as packets 214 for further processing. Further, by selecting more or fewer required bits for the mask 211 and by adjusting the bit length of the hash value 208 and mask 211, different desired sampling ratios can be achieved for the number of packet flows selected among the total number of packets flows to have their packets passed along and output as packets 214. The hash-based sampler 250, therefore, is applied on a per-packet basis to select network packets from a subset of packet flows without requiring flow data to be stored in a state table or in a flow table, and all packets in a particular packet flow will either be selected and passed on for further processing or be ignored and dropped from further processing.

For one example embodiment, consider a network monitoring system according to the disclosed embodiments that is collecting and monitoring input packets from a large number of different packet flows (e.g., 100 or more). A hashing function is implemented by the hash generator 206, for example in FPGA (field programmable gate array) logic, that looks at an N-tuple value generated from fields within each packet from the different packet flows and that outputs a 4-bit hash value. It is also assumed that the hash function is designed to evenly spread the input hash values across the different possible hash output values. Thus for this 4-bit hash example, each N-tuple that identifies each different packet flows will be resolved into one of sixteen different hash values that are possible using the 4-bit hash, and the packet flows will preferably be spread evenly across the sixteen different hash values. For example, if 128 packet flows are being monitored, the hash function would split the packet flows into 16 different groups of 8 different packet flows. The same 4-bit hash value will be generated for each packet flow within a given group of 8 packet flows. The mask is then set to a selected value from 0000 to 1111 (e.g., 0 to 15) and "don't care" values can also be included. In other words, each bit within the multiple-bit mask can be set to a logic "1" or a logic "0" or a "don't care" designation. For the "don't care" designation, a corresponding bit in a hash value will always match the mask whether it is a logic "1" or a logic "0." This use of "don't care" bits within the mask for the hash value matching allows for different subsets of packet flows within the total number of packet flows to be selected to have their related packets passed for further processing. The following TABLE gives an example of these percentages and different selections assuming a 4-bit hash value and various numbers of "don't care" bits and related selection bits. The "don't care" bits are represented by an "x" within this TABLE.

TABLE

EXAMPLE MASK VALUES AND FLOWS SELECTED
USING 4-BIT HASH VALUE AND "DON'T CARE" BITS

| MASK | NUMBER OF SELECTION BITS | FLOWS SELECTED | PERCENTAGE SELECTED |
|---|---|---|---|
| 0000 to 1111 | 4 | 1 of every 16 | 6.25% |
| one don't care bit (e.g., x000, x111) | 3 | 1 of every 8 | 12.5% |
| two don't care bits (e.g., xx00, xx11) | 2 | 1 of every 4 | 25% |
| three don't care bits (e.g., xxx0, xxx1) | 1 | 1 of every 2 | 50% |

Along with the use of "don't care" bits, it is again noted that the bit length of the hash value 208 and corresponding mask 211 can be adjusted to increase or decrease the level of granularity provided in the packet flow selection. Larger bit lengths provide for increased granularity, and shorter bit lengths provide for decreased granularity. Still further, to provide additional granularity for the packet flow selection, the mask 211 can include a Boolean combination of a plurality of sets of multiple bits. For example, packets can be selected where the hash values match one or more Boolean combinations of bit values, which can also include logic "1" bits, logic "0" bits, and "don't care" bits. Boolean operations such as OR, NOR, and/or other desired Boolean operations can also be used for these Boolean combinations. As one example for such a Boolean combination using 4-bit values, packets can be selected that match a mask value of 0000 OR 0001 OR 0010, which can also be expressed as 000x OR 0010. This example Boolean combination would provide a selection of 3 out of every 16 flows (e.g., 18.75% of the flows). Using such Boolean expressions where 4-bit hash values are used, flow selections from $\frac{1}{16}$ (e.g., 6.25%) to $\frac{15}{16}$ (e.g., 93.75%) can be obtained. Other variations can also be implemented while still taking advantage of the hash-based selection of network packets for packet flow sampling in network communication systems.

It is noted that the hash generator 206 can be implemented as a single hash generator or can be implemented as multiple hash generators. The hash generator 206 can also be configured to generate hash values based upon one or more hash algorithms that are applied to all or a portion of the contents of each packet. The hash generators 206 are preferably configured to apply hash algorithm(s) having uniform distribution characteristics such that resulting hash values are generated with even distributions across a range of possible hash values. Further, it is desirable that the hash algorithms generate different hash values for data strings that are different but similar so that similar but different data strings can be distinguished. Other considerations can also be used to select the hash algorithms. It is further noted that SHA-1, MD5, FNV (Fowler-Noll-Vo), and MurmurHash are known algorithms for generating hash values based upon selected input parameters. It is further noted that large cryptographic hash algorithms, such as MD5, may be difficult to utilize for the embodiments described herein because they tend to be complex and slow algorithms. It is also noted that PRBS (pseudo-random binary sequence), CRC (cyclic redundancy check), and other cyclical polynomial computations (e.g., Reed Solomon) could also be utilized to generate hash values. While these cyclical polynomial computations can be easier to implement in hardware, they typically provide worse performance with respect to desirable hash parameters. Non-cryptographic hash algorithms can also be used to provide hash values. If desired, a non-cryptographic MurmurHash-type hash algorithm can be used and can be split into multiple 16-bit hash processes that execute in parallel followed by a final series of mixing steps. Other variations, hash algorithms, and combinations of has algorithms can also be implemented while still taking advantage of the hash-based selection of network packets for packet flow sampling in network communication systems.

It is also noted that the hash-based sampler 250 can be implemented in a variety of difference devices or components within a network communication system include physical and/or virtual processing environments. It is further noted that the hash-based sampler 250 as well as the flow statistics engine 120 and the collection server 130 can be implemented using one or more programmable integrated circuits programmed to perform the operations and functions described herein, and the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). In addition, the flow table 216 and buffers 202/350 as well as the flow statistics database 132 can be implemented as one or more data structures stored in any desired non-transitory tangible computer-readable medium including, for example, one or more data storage devices, flash memories, random access memories, read only memories, programmable memory devices, reprogrammable storage devices, hard drives, floppy disks, DVDs, CD-ROMs, and/or any other non-transitory tangible computer-readable data storage mediums. Other implementations could also be used while still taking advantage of the hash-based selection of network packets for packet flow sampling in network communication systems.

Figure 3A:
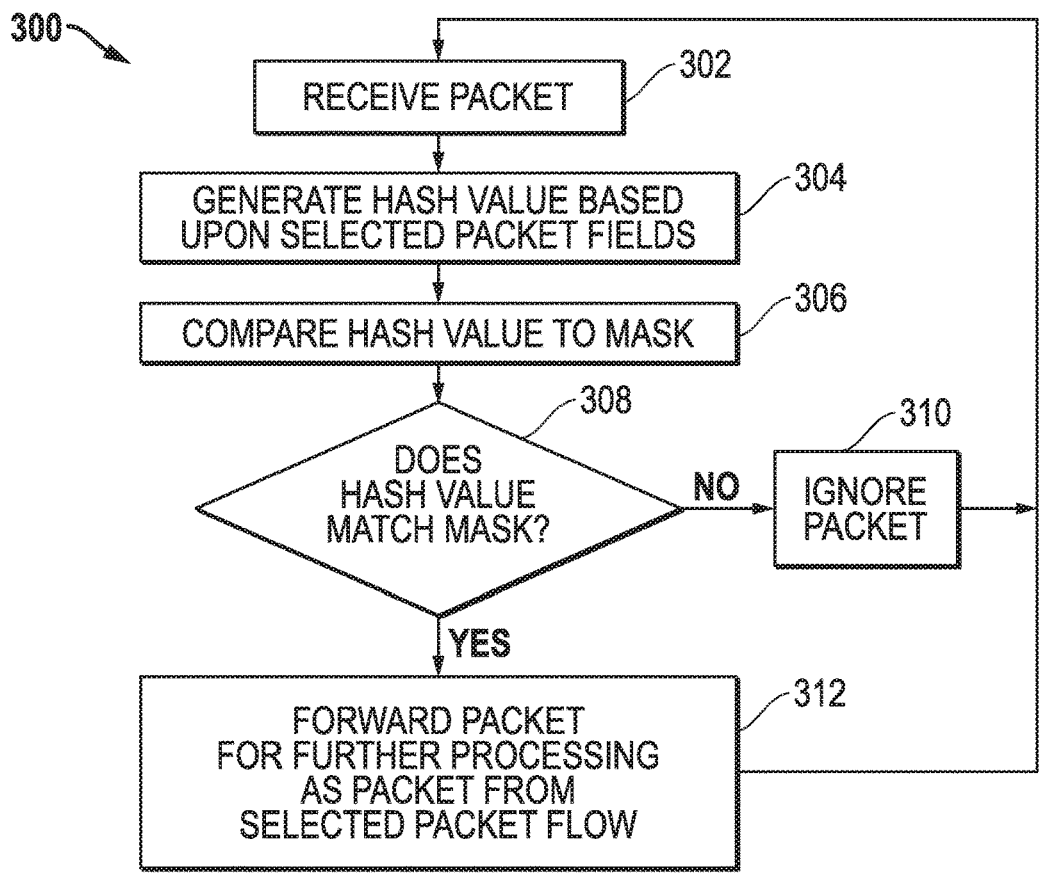
FIG. 3A is a block diagram of an example embodiment for processing packets from selected packet flows based upon hash-base sampling.

FIG. 3A is a block diagram of an example embodiment 300 for processing packets from selected packet flows based upon hash-base sampling. In block 302, a packet is received. In block 304, a hash value is generated based upon selected fields from the packet that are configured to identify the packet flow for the packet. In block 306, the hash value is compared to a mask. In decision block 308, a determination is made based upon the comparison to either ignore the packet or forward the packet for further processing. For the example embodiment shown, the determination is whether the hash value matches the mask. If "NO," then flow passes to block 310 where the packet is ignored, and flow then proceeds back to block 302 where the next packet is received. If "YES," then flow passes to block 312 where the packet is forwarded for further processing as a packet from a selected packet flow. For an alternative embodiment, the determination in block 308 can be whether the hash value does not match the mask. If "YES," then flow still passes to block 312; and if "NO," the flow still passes to block 310. Other variations can also be implemented while still taking advantage of the hash-based selection of network packets for packet flow sampling in network communication systems.

Figure 3B:
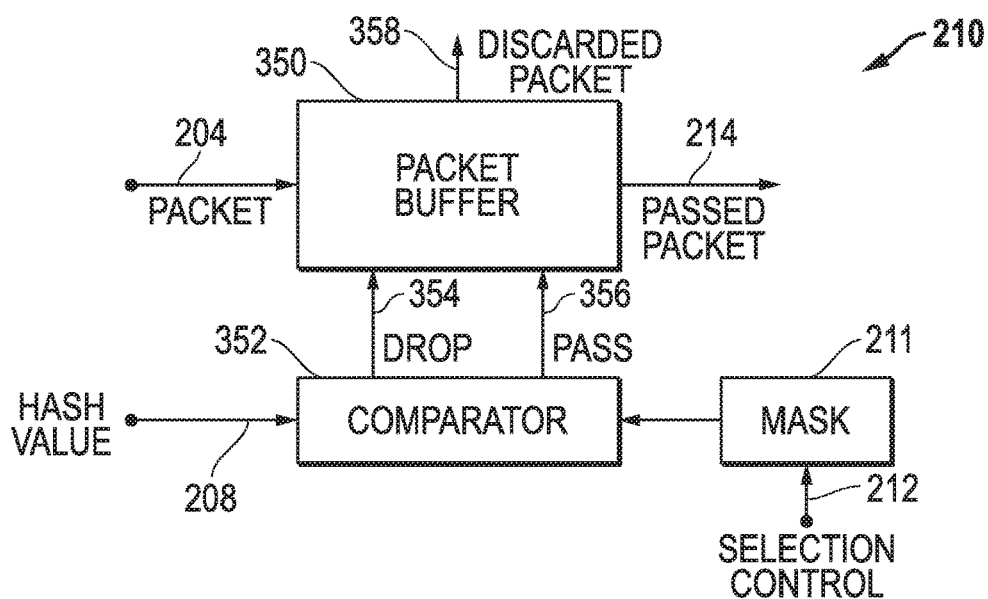
FIG. 3B is a block diagram of an example embodiment for a packet processor that compares hash values to a mask to selected packets for forwarding.

FIG. 3B is a block diagram of an example embodiment for the packet processor 210. Each input packet 204 is initially stored in packet buffer 350. A comparator 352 compares the hash value 208 generated for this packet to the mask 211. Based upon this comparison, a drop control signal 354 or a pass control signal 356 is applied to the packet buffer 350. For example, the pass control signal 354 can be provided to the packet buffer 350 if the hash value 208 matches the mask 211, and the drop control signal 356 can be provided to the packet buffer 305 if the hash value 208 does not match the mask 211. Alternatively, the pass control signal 354 can be provided to the packet buffer 350 if the hash value 208 does not match the mask 211, and the drop control signal 356 can be provided to the packet buffer 305 if the hash value 208 does match the mask 211. If the drop control signal 354 is received for the packet by the packet buffer 350, the packet is discarded as indicated by arrow 358. If the pass control signal 356 is received for the packet by the packet buffer 350, the packet is passed as part of the packets 214 output for further processing. As indicated above, the mask 211 determines the number of packet flows that are selected for further processing, and the mask 211 can be programmed or adjusted over time through selection control signals 212. It is noted that the selection control signals 212 can be generated by one or more different network components within the network communication system, and these selection control signals 212 can then be applied by the hash-based sampler 250 to set the mask 211 and/or otherwise adjust the operation of the comparator 352. It is also noted that the comparator 352 can be implemented in in FPGA logic if desired. Other variations can also be implemented while still taking advantage of the hash-based selection of network packets for packet flow sampling in network communication systems.

It is noted that that the discarded packets 358 can also be forwarded by the packet processor 210 to another network destination for further analysis. For example, the discarded packets 358 can be forwarded to a network tool such as one of the network tools 424 described below. The network tool can then perform additional analysis on the discarded packets 358 as desired. With respect to embodiment 200 of FIG. 2A, for example, even though flow statistics are not generated for these discarded packets 358 by the flow statistics engine 120, these discarded packets 358 can still be forwarded to a network tool for further processing and analysis. Other variations could also be implemented while still taking advantage of the hash-based selection of network packets for packet flow sampling in network communication systems.

Figure 4:
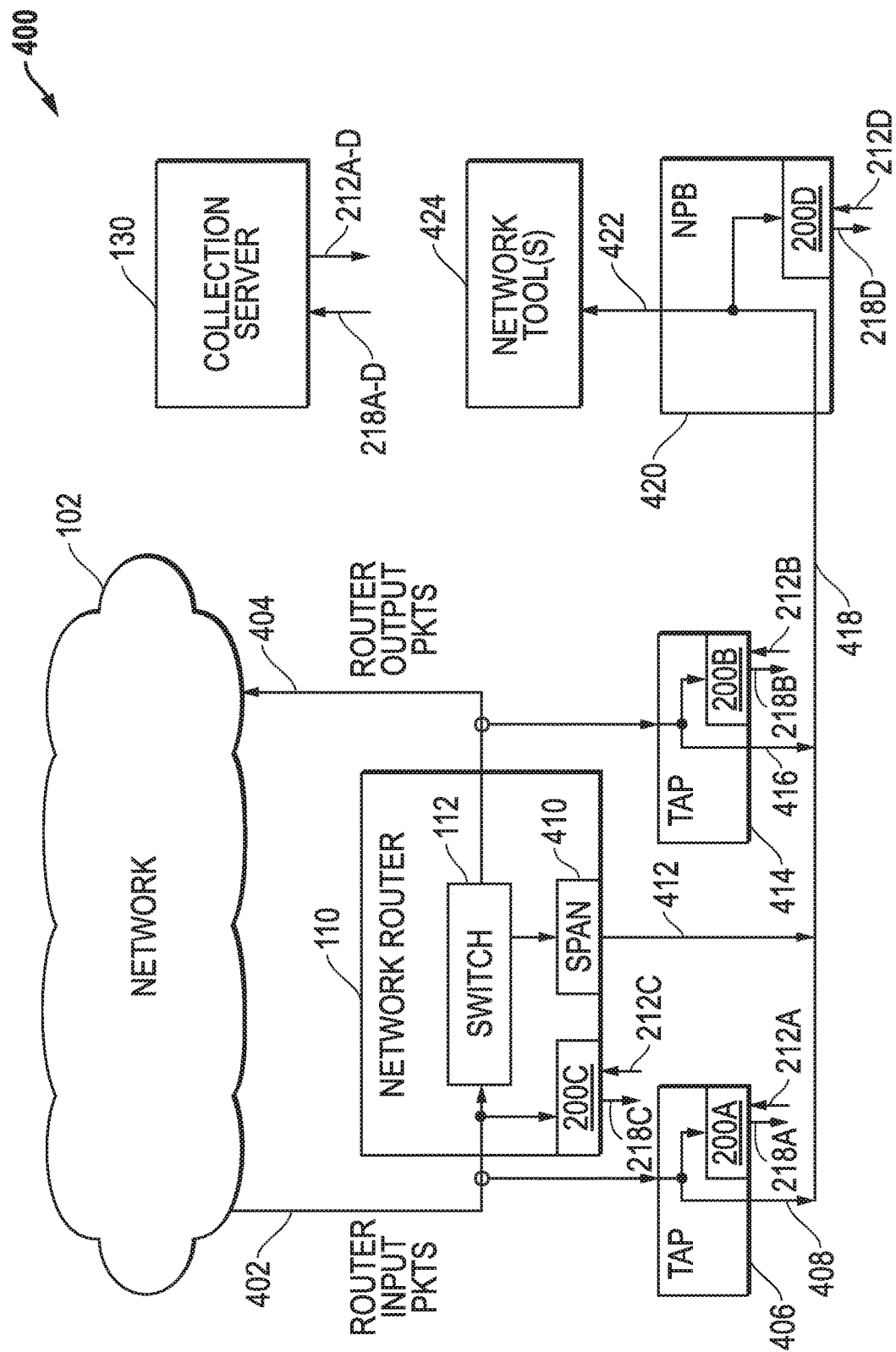
FIG. 4 is a block diagram of an example embodiment of a network communication system showing various possible locations for a hash-based packet flow processor within various components of the network communication system.

FIG. 4 is a block diagram of an example embodiment 400 of a network communication system showing various possible locations for a hash-based packet flow processor 200 within various components of the network communication system. For the embodiment 400, a network 102 includes a number of different network connected devices that are communicating with each other using a number of different packet flows. At least a portion of these packet flows are routed by the network router 110, which can include a number of different input/output (I/O) ports that are used to receive and send packets. For the embodiment 400, packets received by the network router 110 are represented by input packets 402, and packets sent by the network router 110 are represented by output packets 404. A switch 112 within the network router 110 receives the input packets 402 from network sources and routes them to the appropriate network destinations through output packets 404. These input and output packets 402/404 are assumed to include packets within a number of different packet flows for the network 102.

Also as shown, it is assumed that different packet collection devices are used to collect packets to be monitored such as tap (test access port) device 406, tap device 414, and/or SPAN (switched port analyzer) 410. The tap device 406 collects packet copies from the router input packets 402 and forwards them as packets 408 to a network packet broker (NPB) 420. The tap device 414 collects packet copies from the router output packets 404 and forwards them as packets 416 to the NPB 420. The SPAN port 410 collects packet copies for packets processed by the network router 110 and forwards them as packets 412 to the NPB 420. The NPB 420 receives packets 418 from various collection sources and forwards them to one or more network tools 424 based upon one or more internally defined filters. It is noted that packet collection devices 406/414/410, NPB 420, and network tools 424 are provided only as example network components. Additional and/or different network components could also be provided within the network communication system. It is also noted that one or more of these network components could be implemented as virtual platforms within virtual processing environments hosted by one or more host servers. It is further noted that the network 102 can include any of a wide variety of network connected systems including server systems, data storage systems, desktop computer systems, portable computer systems, network routers, broadband routers, and/or any other desired network connected systems or devices that communicate network packets. It is further noted that network tools 424 can be any of a wide variety of network related security tools including traffic monitors, packet sniffers, data recorders, voice-over-IP monitors, intrusion detection systems, network security systems, application monitors and/or any other desired network security tool.

As shown for embodiment 400, a hash-based packet flow processor 200 including a hash-based sampler 250 can be implemented within one or more network components within the network communication system. For example, a hash-based packet flow processor 200A can be implemented within the tap device 406, can receive selection control signals 212A, and can output report packets 218A. A hash-based packet flow processor 200B can be implemented within the tap device 406, can receive selection control signals 212A, and can output report packets 218A. A hash-based packet flow processor 200C can be implemented within the network router 110, can receive selection control signals 212C, and can output report packets 218C. A hash-based packet flow processor 200D can be included within the NPB 420, can receive selection control signals 212D, and can output report packets 218D. A collection server 130 can also operate within the network communication system, can control operations of the hash-based packet flow processors 200A-D through control signals 212A-D, and can collect and aggregate information from the report packets 218A-D. It is further noted that the collection server 130 can be implemented within one or more different network connected device. For example, the collection server 130 can be implemented in full or in part within the NPB 420, for example, the NPB 420 can be used to generate one or more of the control signals 218A-D. Other variations could also be implemented while still taking advantage of the hash-based selection of network packets for packet flow sampling in network communication systems.

Figure 5:
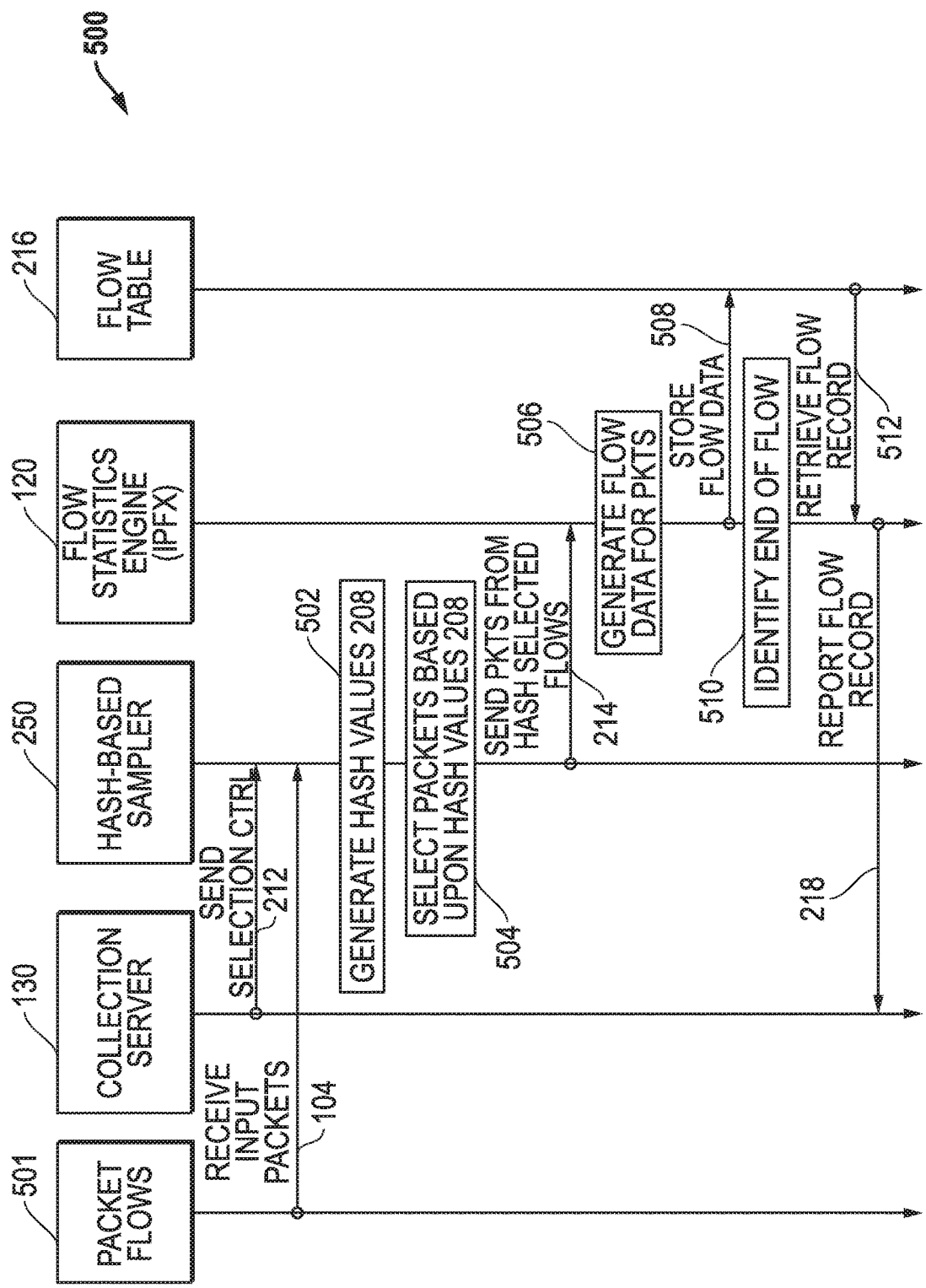
FIG. 5 is a swim lane diagram of an example embodiment for operation of a hash-based sampler to sample packets within selected packet flows for further processing.

FIG. 5 is a swim lane diagram of an example embodiment 500 for operation of a hash-based sampler 250 to sample packets within selected packet flows for further processing. For the embodiment shown, a collection server 130 sends the control signals 212 to the hash-based sampler 250, for example, to set the mask 211 as described above. The hash-based sampler 250 then receives input packets 104 associated with packet flows 501. As indicated by block 502, the hash-based sampler 250 generates hash values 208 for the received packets 104. As indicated by block 504, the hash-based sampler 250 selects packets based upon the hash values 208, for example, by comparing the hash values 208 to the mask 211 as described above. The hash-based sampler 250 then outputs the selected packets 214 for further processing, such as to the flow statistics engine 120. These selected packets represent packets within a subset of packet flows based upon the hash-based sampling. As indicated by block 506, the flow statistics engine 120 then generates flow data for the selected packets, for example, according to a flow statistics protocol such as IPFIX. The flow data is then collected and stored in a flow record for the packet flow within flow table 216 as indicated by arrow 508. As indicated by block 510, the end of a flow is identified by the flow statistics engine 120, and the flow record is then retrieved by the flow statistics engine 120 from the flow table 216 as indicated by arrow 512. The flow statistics engine 120 then reports the flow record to the collection server 130 as indicated by arrow 218 where the flow statistics data can be aggregated as described above. As such, the flow table 216 as well as the flow statistics data collected and aggregated by the collection server 120 include only a subset of the original packet flows 501 as selected by the hash-based sampler 250.

Figure 6:
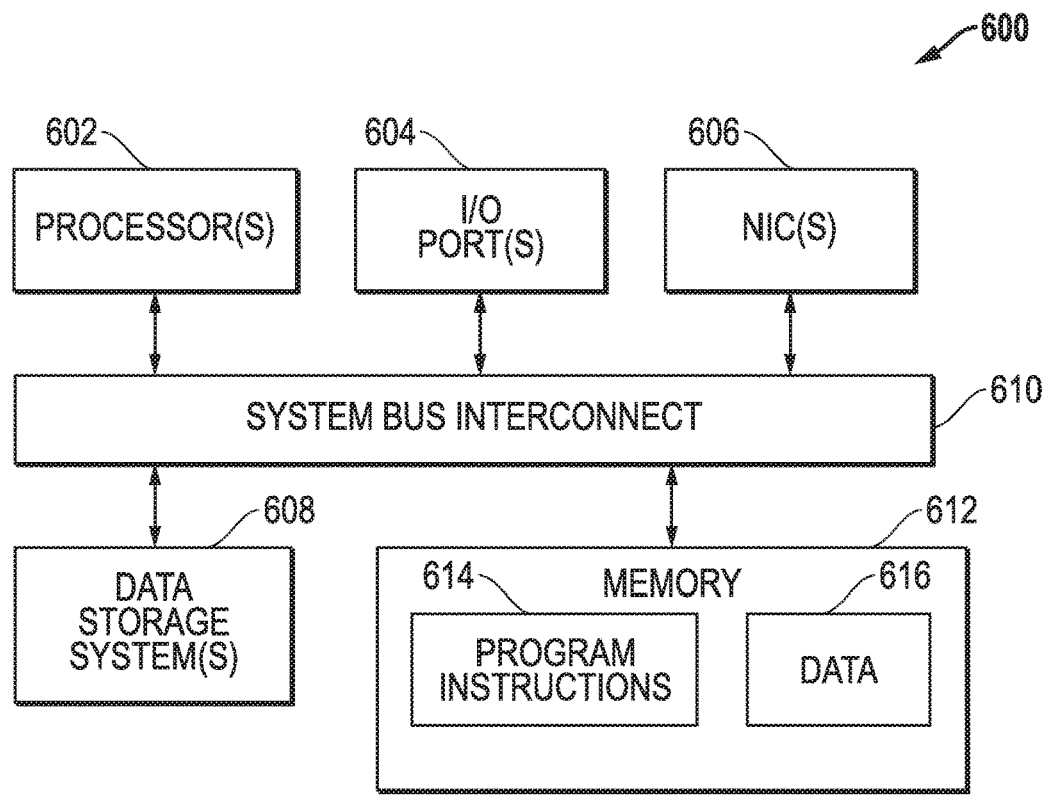
FIG. 6 is a block diagram of an example embodiment for a computing platform that can be used to implement one or more of the components for the network communication system.

FIG. 6 is a block diagram of an example embodiment for a computing platform 600 that can be used to implement one or more of the components described herein including the hash-based sampler 250, the flow statistics engine 120, NPB 420, network tools 424, the collection server 130, and/or other components of the network communication system. The computing platform 600 includes one or more processors 602 or other programmable integrated circuit(s) that are programmed with code or logic instructions to perform the operations and functions described herein. In addition to processors 602 or other programmable integrated circuits, the computing platform 600 can also include one or more input/output (I/O) ports 1154, one or more network interface cards (NICs) 606, one or more data storage systems 608, and memory 612 coupled to communicate with each other through a system bus interconnect 610. The memory 612 can include one or more memory devices that store instructions 614 and/or data 616 during operation of the computing platform 600. For example during operation, one or more of the processors 602 or other programmable integrated circuits can load software or program instructions stored in the data storage systems 608 into the memory 612 and then execute the software or program instructions to perform the operations and functions described herein. It is noted that the memory 612 and the data storage system(s) 608 can be implemented using any desired non-transitory tangible computer-readable medium, such as for example, one or more data storage devices, flash memories, random access memories, read only memories, programmable memory devices, reprogrammable storage devices, hard drives, floppy disks, DVDs, CD-ROMs, and/or any other non-transitory tangible computer-readable data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing platforms can also be implemented while still taking advantage of the hash-based selection of network packets for packet flow sampling in network communication systems.

Figure 7:
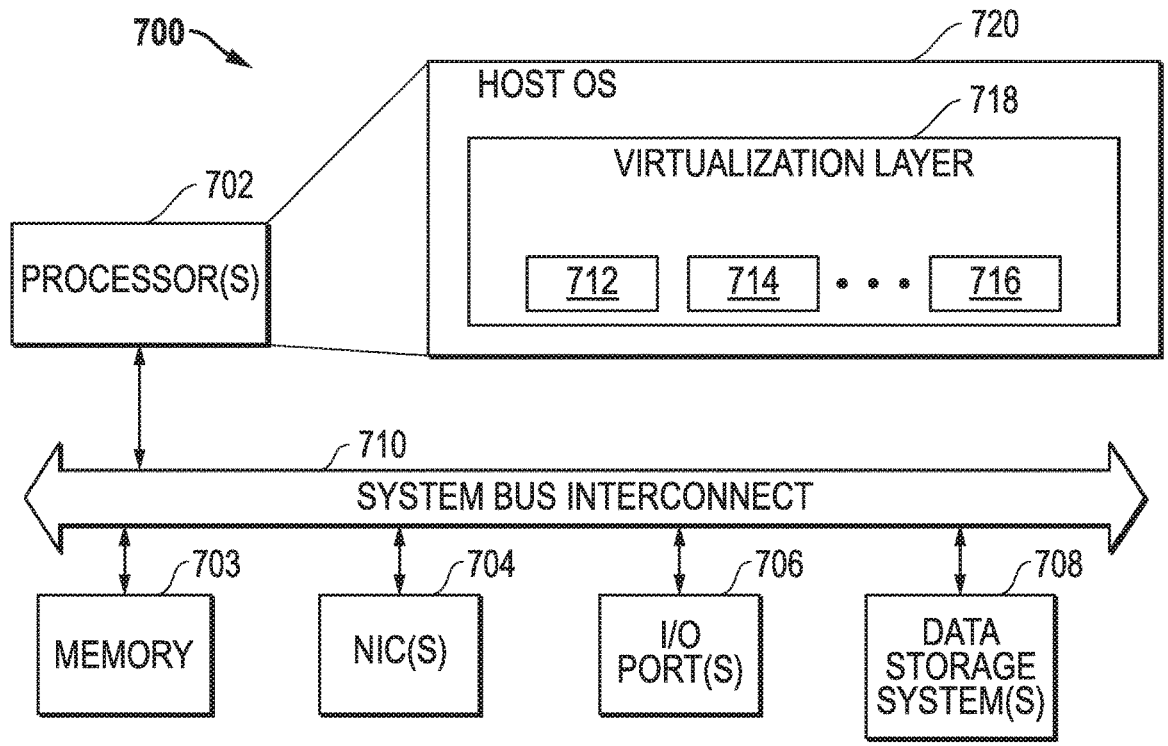
FIG. 7 is a block diagram of an example embodiment 700 for a host server that can provide a virtual processing environment for virtual instances of one or more components for the network communication system.

FIG. 7 is a block diagram of an example embodiment 700 for a host server that can provide a virtual processing environment for virtual instances of one or more components described herein including the hash-based sampler 250, the flow statistics engine 120, NPB 420, network tools 424, the collection server 130, and/or other components within the network communication system. For the example embodiment depicted, the host server 700 includes one or more processors 702 or other programmable integrated circuits that are programmed to provide a virtualization layer 718 for one or more virtual platforms 712, 714, ... 716 that can implement one or more of the components described herein. The processors 702 or other programmable integrated circuit(s) can be programmed with code or logic instructions stored in the data storage systems 708 to perform the operations and functions described herein. In addition to the processors 702 or other programmable integrated circuits, the host server 700 also includes one or more network interface cards (NICs) 704, one or more input/output (I/O) ports 706, one or more data storage systems 708, and memory 703 coupled to communicate with each other through a system bus interconnect 710. In operation, virtualization layer 718 and the virtual platforms 712, 714, . . . 716 run on top of a host operating system (OS) 720. For example, the host operating system 720, the virtualization layer 718, and the virtual platforms 712, 714, . . . 716 can be initialized, controlled, and operated by the processors or programmable integrated circuits 702 which load and execute software code and/or programming instructions stored in the data storage systems 708 to perform the functions described herein.

It is noted that the memory 703 can include one or more memory devices that store program instructions and/or data used for operation of the host server 700. For example during operation, one or more of the processors 702 or other programmable integrated circuits can load software or program instructions stored in the data storage systems 708 into the memory 703 and then execute the software or program instructions to perform the operations and functions described herein. It is further noted that the data storage system(s) 708 and the memory 703 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the hash-based selection of network packets for packet flow sampling in network communication systems.

The virtualization layer 718 for the virtual platforms can be implemented using any desired virtualization layer, such as a hypervisor or a container engine, that provides a virtual processing environment for the virtual platforms such as virtual machines (VMs) or application instances. For one embodiment, the container engine can be implemented as a DOCKER container for a Linux operating system configured to execute DOCKER containers, which are software components that are designed to be compatible with a Linux-based DOCKER container engine. Other variations could also be implemented.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the hash-based selection of network packets for packet flow sampling in network communication systems.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to forward selected packets based upon packet flows within a network communication system, comprising:
receiving input packets associated with packet flows within a network communication system;
generating hash values for the input packets based upon fields within the input packets, the fields identifying packet flows for the input packets;
selecting packets from the input packets based upon a comparison of the hash values to a mask, the mask determining a subset of the packet flows;
forwarding the selected packets from the subset of the packet flows for further processing; and
discarding non-selected packets.

2. The method of claim 1, wherein the input packets are selected for forwarding based upon at least one of the hash values matching the mask or the hash values not matching the mask.

3. The method of claim 1, wherein the mask is programmable to select a portion of packet flows to include within the subset of flow packets.

4. The method of claim 3, wherein the mask comprises multiple bits, each of the multiple bits being set to a logic "1" or a logic "0" or a "don't care" value.

5. The method of claim 4, wherein the mask comprises a Boolean combination of a plurality of sets of multiple bits.

6. The method of claim 3, further comprising receiving a control signal to determine the mask.

7. The method of claim 6, wherein the receiving, generating, selecting, forwarding, and discarding are performed in a tap device, and the control signals are received from a network packet broker.

8. The method of claim 1, wherein the fields for generation of the hash values comprises a source address (SIP), a destination address (DIP), a protocol type (TYPE), a source port (S-PORT), and a destination port (D-PORT).

9. The method of claim 8, further comprising, before generating each hash value, performing an XOR operation on the source address (SIP) and the destination address (DIP) and performing an XOR operation on the source port (S-PORT) and the destination port (D-PORT).

10. The method of claim 8, further comprising, before generating each hash value, sorting the source address (SIP), the destination address (DIP), the protocol type (TYPE), the source port (S-PORT), and the destination port (D-PORT).

11. The method of claim 1, further comprising processing the selected packets forwarded from the subset of packet flows to generate flow statistics data for the selected packets.

12. The method of claim 11, further comprising storing the flow statistics data within a flow table, each record within the flow table being used to store flow statistics data for a particular packet flow.

13. The method of claim 12, wherein the flow statistics data comprises data collected according to the IPFIX (IP Flow Information eXport) protocol.

14. The method of claim 12, further comprising forwarding report packets to a collection server when packet flows end, each report packet including one or more records from the flow table including packet flow statistics data.

15. The method of claim 11, wherein the receiving, generating, selecting, forwarding, discarding, and processing are performed within a tap device.

16. The method of claim 1, wherein the receiving, generating, selecting, forwarding, and discarding are performed within at least one of a tap device, a network router, or a network packet broker.

17. The method of claim 1, further comprising forwarding the discarded non-selected packets to a network tool for further processing.

18. A system to forward selected packets based upon packet flows within a network communication system, comprising:
    an input buffer configured to receive input packets associated with packet flows within a network communication system;
    a hash generator coupled to receive the input packets from the input buffer and configured to generate hash values for the input packets based upon fields within the input packets, the fields being selected to identify packet flows for the input packets; and
    a packet processor coupled to receive the input packets from the input buffer and to receive the hash values from the hash generator, the packet processor being programmed to:
        select packets from the input packets based upon a comparison of the hash values to a mask, the mask determining a subset of the packet flows;
        forward the selected packets from the subset of the packet flows for further processing; and
        discard non-selected packets.

19. The system of claim 18, wherein the packet processor is configured to select input packets for forwarding based upon at least one of the hash values matching the mask or the hash values not matching the mask.

20. The system of claim 18, wherein the mask is programmable to select a portion of packet flows to include within the subset of flow packets.

21. The system of claim 20, wherein the mask comprises multiple bits, each of the multiple bits being set to a logic "1" or a logic "0" or a "don't care" value.

22. The system of claim 21, wherein the mask comprises a Boolean combination of a plurality of sets of multiple bits.

23. The system of claim 20, wherein the packet processor is further configured to receive a control signal to determine the mask.

24. The system of claim 23, wherein the input buffer, the hash generator, and the packet processor are located within a tap device, and the tap device is configured to receive the control signals from a network packet broker.

25. The system of claim 18, wherein the fields for generation of the hash values comprises a source address (SIP), a destination address (DIP), a protocol type (TYPE), a source port (S-PORT), and a destination port (D-PORT).

26. The system of claim 25, wherein the hash generator is further configured, before generating each hash value, to perform an XOR operation on the source address (SIP) and the destination address (DIP) and to perform an XOR operation on the source port (S-PORT) and the destination port (D-PORT).

27. The system of claim 25, wherein the hash generator is further configured, before generating each hash value, to sort the source address (SIP), the destination address (DIP), the protocol type (TYPE), the source port (S-PORT), and the destination port (D-PORT).

28. The system of claim 18, further comprising a flow statistics engine coupled to receive the selected packets forwarded by the packet processor and configured to process the selected packets to generate flow statistics data for the selected packets.

29. The system of claim 28, wherein the flow statistics engine is further configured to store the flow statistics data within a flow table, each record within the flow table being used to store flow statistics data for a particular packet flow.

30. The system of claim 29, wherein the flow statistics data comprises data collected according to the IPFIX (IP Flow Information eXport) protocol.

31. The system of claim 29, wherein the flow statistics engine is further configured to forward report packets to a collection server when packet flows end, each report packet including one or more records from the flow table including packet flow statistics data.

32. The system of claim 28, wherein the input buffer, the hash generator, the packet processor, and the flow statistics engine are located within a tap device.

33. The system of claim 18, wherein the input buffer, the hash generator, and the packet processor are located within at least one of a tap device, a network router, or a network packet broker.

34. The system of claim 18, wherein the packet processor is further configured to forward the discarded non-selected packets to a network tool for further processing.

* * * * *